(12) United States Patent
Yoshino

(10) Patent No.: US 11,546,065 B2
(45) Date of Patent: Jan. 3, 2023

(54) OPTICAL MODULATION METHOD AND DEVICE USING NESTED OPTICAL MODULATOR

(71) Applicant: NEC Corporation, Tokyo (JP)

(72) Inventor: Ken-ichiro Yoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/437,210

(22) PCT Filed: Mar. 6, 2020

(86) PCT No.: PCT/JP2020/009781
§ 371 (c)(1),
(2) Date: Sep. 8, 2021

(87) PCT Pub. No.: WO2020/189348
PCT Pub. Date: Sep. 24, 2020

(65) Prior Publication Data
US 2022/0182151 A1 Jun. 9, 2022

(30) Foreign Application Priority Data
Mar. 18, 2019 (JP) .............................. JP2019-049863

(51) Int. Cl.
*H04B 10/556* (2013.01)
*H04B 10/70* (2013.01)
(52) U.S. Cl.
CPC ........... *H04B 10/556* (2013.01); *H04B 10/70* (2013.01)
(58) Field of Classification Search
None
See application file for complete search history.

(56) References Cited

U.S. PATENT DOCUMENTS 5,101,450 A * 3/1992 Olshansky .......... H04J 14/0298
385/40
6,118,566 A * 9/2000 Price .................. H04B 10/2507
398/1

(Continued)

FOREIGN PATENT DOCUMENTS

CN 108964778 A 12/2018
JP 2009-060555 A 3/2009

(Continued)

OTHER PUBLICATIONS

International Search Report for PCT Application No. PCT/JP2020/009781, dated Jun. 9, 2020.

(Continued)

*Primary Examiner* — Darren E Wolf

(57) ABSTRACT

An optical modulation method and device capable of stably generating an optical signal including a zero-intensity state among four states required for phase-time coding scheme by a nested modulator, is provided.

A controller controls the phase difference generated by the phase shifter and an intensity and a magnitude of phase modulation provided by each of the first modulator and the second modulator to change an output lightwave of the nested modulator between four constellation points (S1-S4) on IQ plane. A first constellation point (S4) of the four constellation points has an intensity of 0, a second constellation point (S1) has a relative intensity of 1, each of a third constellation point (S2) and a fourth constellation point (S3) has a relative intensity ranging from 0 to 1, and the third and the fourth constellation points has a phase difference of 90 degrees.

10 Claims, 11 Drawing Sheets

(56) References Cited

U.S. PATENT DOCUMENTS

| | | | |
|---|---|---|---|
| 2007/0212075 A1* | 9/2007 | Yin | H04B 10/5561 398/183 |
| 2009/0074425 A1* | 3/2009 | Tanaka | H04B 10/548 398/185 |
| 2012/0106888 A1 | 5/2012 | Goh | |
| 2014/0010533 A1* | 1/2014 | Yan | H04B 10/50575 398/38 |
| 2014/0308047 A1* | 10/2014 | Mak | H04B 10/5055 359/279 |
| 2020/0067704 A1 | 2/2020 | Zbinden et al. | |

FOREIGN PATENT DOCUMENTS

| | | |
|---|---|---|
| JP | 5286852 B | 9/2013 |
| WO | 2011/004615 A1 | 1/2011 |
| WO | 2018/124357 A1 | 7/2018 |
| WO | 2018/202698 A1 | 11/2018 |

OTHER PUBLICATIONS

Tajima Akio, "Fast Quantum Cryptography System using Single Photon Communication", IEICE Technical Report, Jun. 5, 2008, vol. 108.No.83, pp. 51-56.

* cited by examiner

EXEMPLARY EMBODIMENT

EXEMPLARY EMBODIMENT
(AN EXAMPLE OF CONSTELLATION)

COMPARATIVE EXAMPLE
(QPSK)

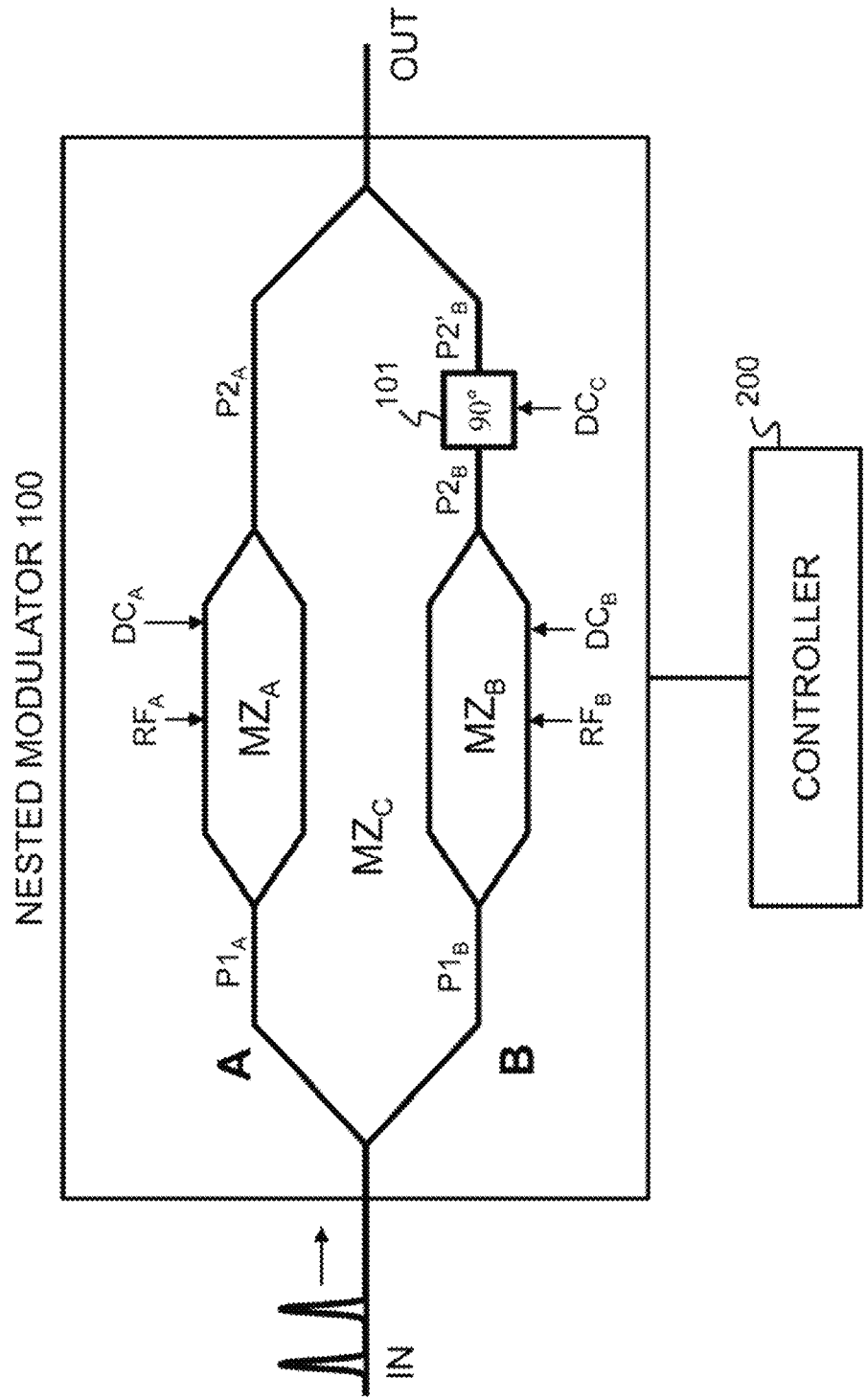

SECOND EXAMPLE

THIRD EXAMPLE

OPTICAL MODULATION METHOD AND DEVICE USING NESTED OPTICAL MODULATOR

This application is a National Stage Entry of PCT/JP2020/009781 filed on Mar. 6, 2020, which claims priority from Japanese Patent Application 2019-049863 filed on Mar. 18, 2019, the contents of all of which are incorporated herein by reference, in their entirety.

TECHNICAL FIELD

The present invention relates to modulation techniques for optical pulses in an optical communication system, and more particularly to optical pulse modulation techniques based on a phase-time coding scheme.

BACKGROUND ART

An example of the phase-time coding (or YZ-state) scheme is described in Patent Literature 1. The phase-time coding scheme may be applied to, for instance, two consecutive optical pulses which are coherent. In this case, as illustrated in FIG. 1, a relative phase between the two consecutive pulses is binary-modulated and any one of the two consecutive optical pulses is intensity-modulated to 0, thereby generating the two consecutive optical pulses in four states. In the example of FIG. 1, it is assumed that the two consecutive optical pulses are labeled with P1 and P2, respectively and the leading and following pulses of a halved intensity are labeled with p1 and p2, respectively. The four states are generated as follows: Y0 state in which the leading pulse p1 is advanced 90° in phase with respect to the following pulse p2; Y1 state in which the leading pulse p1 is delayed 90° in phase with respect to the following pulse p2; Z0 state in which only the leading pulse P1 is extinguished; and Z1 state in which only the following pulse P2 is extinguished.

A modulator according to Patent Literature 1 employs a dual-drive intensity modulator in which a pair of phase modulators are connected in parallel. Phase modulation {θ, θ+90°} and {θ-90°, θ} is applied to the pair of phase modulators, thereby generating the above-described four states of phase-time coding.

Further, Patent Literature 2 discloses a nested optical modulator capable of performing not only QPSK (Quadrature Phase Shift Keying) but also vector-synthesis of arbitrary constellation points by setting the amplitude and phase of a signal to multiple values.

BACKGROUND ART LITERATURE LIST

Patent Literature

[Patent Literature 1] JP Patent No. 5286852
[Patent Literature 2] International Publication No. WO2011/004615.

SUMMARY OF INVENTION

Problems to be Solved by Invention

As described above, it is necessary for the phase-time coding scheme to generate four-state signal light through intensity modulation and phase modulation on optical pulses. However, Patent Literature 2 provides merely a general description such that arbitrary voltages are applied to high frequency electrodes and DC bias electrodes to enable vector synthesis of arbitrary constellation points. Accordingly, Patent Literature 2 does not disclose any specific method by which a nested modulator is used to generate a four-state light signal required for the phase-time coding scheme.

An object of the present invention is to provide an optical modulation method and device capable of stably generating an optical signal including a zero-intensity state among the four states required for the phase-time coding scheme by a nested modulator.

Solution to Problem

According to one aspect of the present invention, an optical modulation device includes: a nested modulator including a first modulator and a second modulator of Mach-Zehnder type, and a phase shifter, wherein the first modulator and the second modulator are connected in parallel, wherein the phase shifter generates a predetermined phase difference between output lightwaves of the first modulator and the second modulator; a control means that controls the phase difference generated by the phase shifter and an intensity and a magnitude of phase modulation provided by each of the first modulator and the second modulator, to change an output lightwave of the nested modulator between four constellation points on IQ plane, wherein a first constellation point of the four constellation points has an intensity of 0, a second constellation point has a relative intensity of 1, each of a third constellation point and a fourth constellation point has a relative intensity ranging from 0 to 1, and the third and the fourth constellation points has a phase difference of 90 degrees.

According to another aspect of the present invention, an optical modulation method using a nested modulator including a first modulator and a second modulator of Mach-Zehnder type, and a phase shifter, wherein the first modulator and the second modulator are connected in parallel, wherein the phase shifter generates a predetermined phase difference between output lightwaves of the first modulator and the second modulator, the method includes: by a control means, controlling the phase difference generated by the phase shifter and an intensity and a magnitude of phase modulation provided by each of the first modulator and the second modulator, to change an output lightwave of the nested modulator between four constellation points on IQ plane; wherein a first constellation point of the four constellation points has an intensity of 0, a second constellation point has a relative intensity of 1, each of a third constellation point and a fourth constellation point has a relative intensity ranging from 0 to 1, and the third and the fourth constellation points has a phase difference of 90 degrees.

Advantages of Invention

According to the present invention, an optical signal including a zero-intensity state among the four states required for the phase-time coding scheme can be stably generated by a nested modulator.

BRIEF DESCRIPTION OF DRAWINGS

FIG. 5 is a schematic configuration diagram illustrating an example of a planar configuration of a nested modulator included in an optical modulator according to a first example of the present invention.

EXEMPLARY EMBODIMENTS OF INVENTION

<Outline of Exemplary Embodiments>

According to an exemplary embodiment of the present invention, a nested optical modulator is used in which two MZ (Mach-Zehnder) modulators are connected in parallel by two waveguides (main arms) composing an interferometer. Voltages corresponding to a predetermined phase modulation are applied to the RF electrodes of the two MZ modulators and the DC bias electrode of the main arm in the predetermined order. By controlling the applied voltages providing a phase modulation and the order of their application, it is possible to generate a four-state signal lightwave including the zero-intensity state required for the phase-time coding scheme. The signal lightwave required for the phase-time coding can be generated by a single nested optical modulator, which can achieve size and cost reductions.

Hereinafter, exemplary embodiments of the present invention will be described in detail with reference to the drawings. However, the components described in the following embodiments and examples are merely examples, and the technical scope of the present invention is not limited to them.

1. Exemplary Embodiments 1.1) Structure

Figure 1:
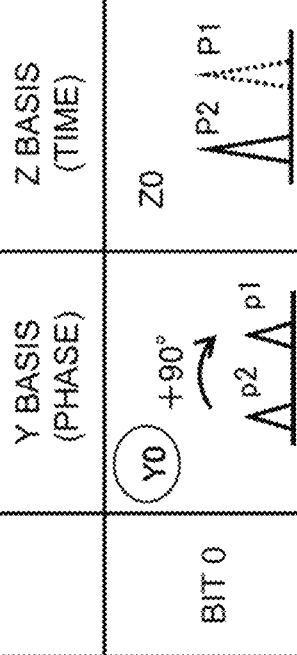
FIG. 1 is a YZ basis state diagram illustrating an example of phase-time coding as a background technique.
Figure 2:
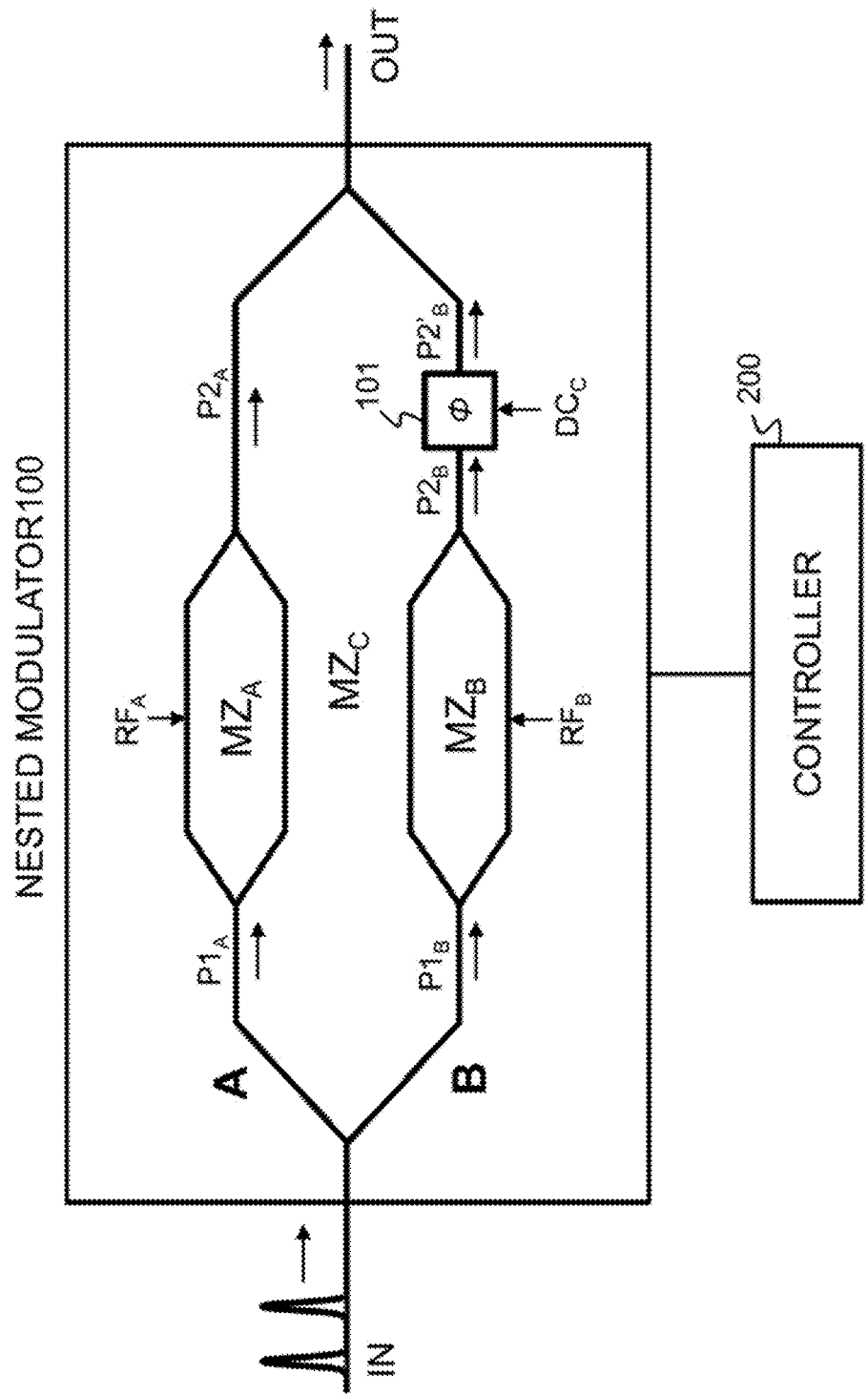
FIG. 2 is a schematic configuration diagram illustrating an example of a planar configuration of a nested modulator included in an optical modulation device according to an exemplary embodiment of the present invention.

As illustrated in FIG. 2, a nested modulator 100 used in the preset exemplary embodiment has a nested structure in which two MZ modulators $MZ_A$ and $MZ_B$ are connected to the arms A and B of a main MZ interferometer $MZ_C$, respectively. Any one of the main arms (the main arm B in FIG. 2) is provided with a phase shifter 101 to generate a relative phase modulation difference φ between the main arms. The operation of the nested modulator 100 is controlled by a controller 200. As will be described later, the RF voltages applied respectively to the MZ modulators $MZ_A$ and $MZ_B$ and the DC voltage applied to the phase shifter 101 are controlled by the controller 200.

Figure 3:
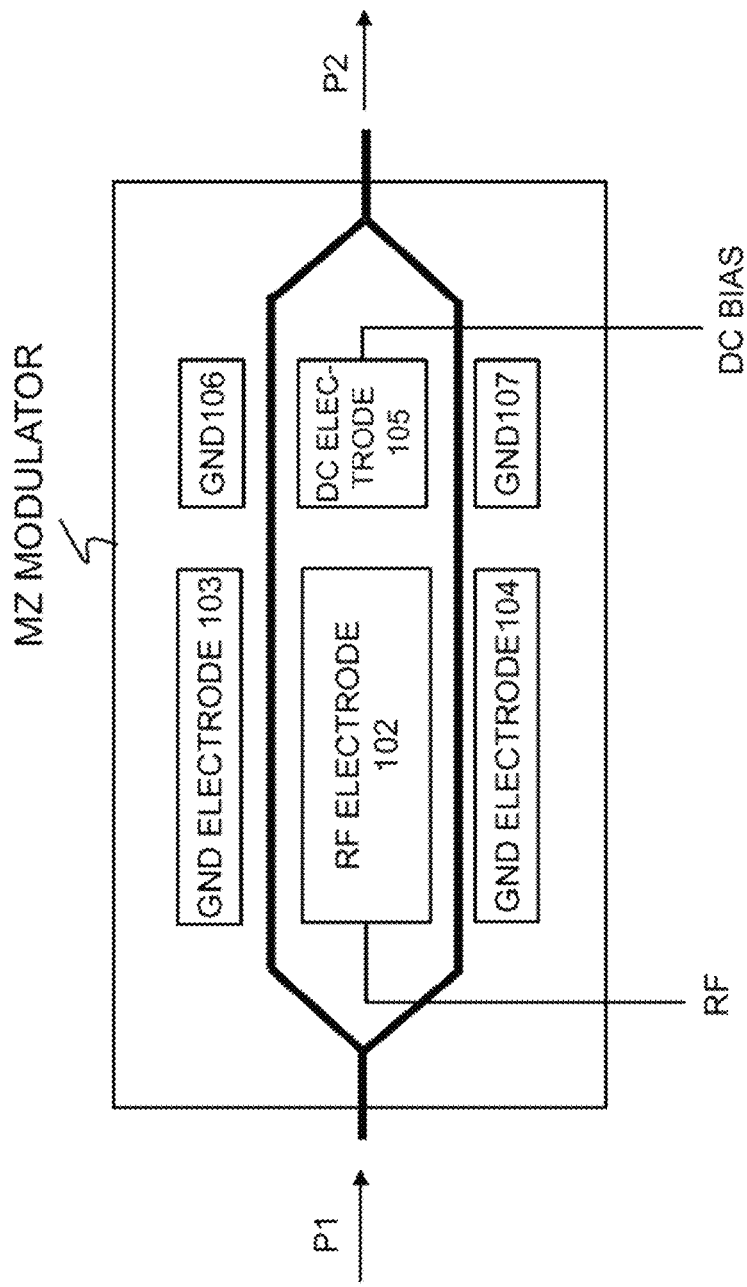
FIG. 3 is a schematic configuration diagram illustrating an example of a planar configuration of a MZ modulator used in the present exemplary embodiment.

As illustrated in FIG. 3, a MZ modulator MZ ($MZ_A$ or $MZ_B$) has such a structure that an RF (Radio Frequency or High Frequency) electrode 102 extending in a waveguide direction is provided between two waveguides (sub arms) of the MZ interferometer and reference GND electrodes 103 and 104 are provided on the outsides of the two sub arms, respectively. Accordingly, electric fields in the opposite directions according to the applied voltage are applied to the upper and lower sub arms according to the polarity of the voltage applied to the RF electrode, causing the refractive index of each sub arm to vary in the opposite directions due to the electro-optical effect. This change in refractive index causes phase shifts in the opposite directions between the upper and lower sub arms, which allows phase modulation of pulses passing through the MZ modulator.

For example, when an RF voltage corresponds to a phase difference of 0, an input optical pulse signal P1 is output as an optical pulse signal P2 with the same intensity (ON state). When the RF voltage corresponds to a phase difference of 180 degrees (°), two branched optical pulses are canceled to output an output lightwave P2 in the extinction state (OFF state). Hereinafter, the RF voltage that realizes a phase difference θ° will be referred to as "θ° RF voltage" for convenience.

The MZ modulator MZ has the DC bias electrode 105 between the sub arms and GND electrodes 106 and 107 outside the sub arms facing the DC bias electrode 105 in order to generate a desired phase difference. By controlling the DC bias voltage ($DC_A$ or $DC_B$) applied to the electrode 105, the modulation operating point of phase modulation can be adjusted.

The nested modulator 100 has such a structure that the MZ modulators $MZ_A$ and $MZ_B$ each structured as shown in FIG. 3 are connected in parallel by main arms A and B as shown in FIG. 2, and the phase shifter 101 is further provided on the main arm B. The phase shifter 101 provides a relative phase modulation difference φ between the main arms. The phase shifter 101 may be composed of the DC bias electrode and the GND electrode which are structured as illustrated in FIG. 3. In other words, the operating point of phase modulation in the nested modulator 100 can be adjusted so as to provide a desired phase difference φ by controlling the voltage $DC_C$ applied to the DC bias electrode.

Figure 4A:
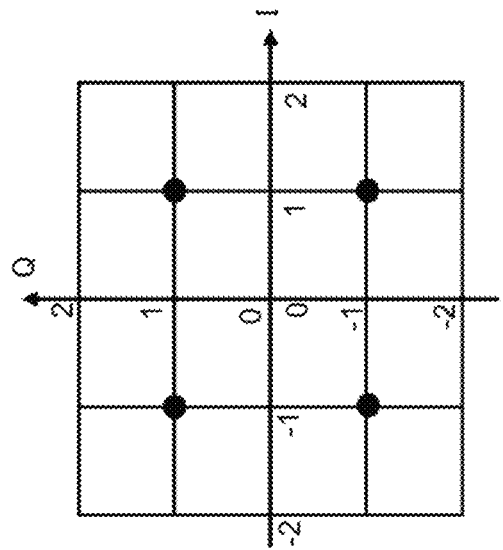
FIG. 4A is a diagram illustrating an example of constellation on I-Q plane of an optical pulse obtained by the nested modulator according to the present exemplary embodiment.

The nested modulator 100 modulates input optical pulses according to the control of the controller 200 as described below, and outputs optical pulses in four states including the intensity of 0. These four states correspond to four constellation points on the I-Q plane. FIG. 4A shows an example of the constellation. Hereinafter, the modulation operation of the nested modulator 100 will be described.

1.2) Operation

Returning to FIG. 2, the input optical pulse IN is branched into two optical pulses $P1_A$ and $P1_B$ at the branch portion of the MZ interferometer $MZ_C$, and the branched optical pulses $P1_A$ and $P1_B$ are sent as input to the MZ modulators $MZ_A$ and $MZ_B$, respectively. The MZ modulators $MZ_A$ and $MZ_B$ perform predetermined phase modulation on the branched optical pulses $P1_A$, and $P1_B$ according to the applied RF voltages RFA and $RF_B$, respectively, and output the phase-modulated branched optical pulses $P2_A$ and $P2_B$, respectively. The branched optical pulse $P2_B$ is further phase-modulated by the phase shifter 101 that gives a predetermined phase difference φ between the main arms, to generate a branched optical pulse $P2'_B$. In this way, the optical pulse OUT is output by combining the branched optical pulse $P2_A$ on the main arm A and the branched optical pulse $P2'_B$ on the main arm B.

Figure 4B:
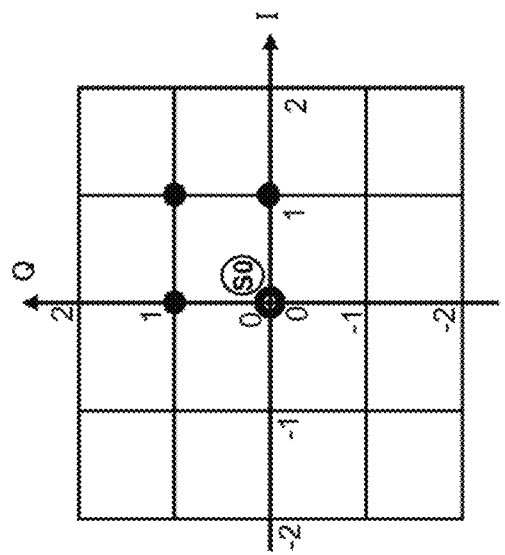
FIG. 4B is a diagram illustrating QPSK constellation as a comparative example.

As illustrated in FIG. 4A, the output optical pulse OUT has four states including the intensity of 0 (constellation point S0). The arrangement of three constellation points other than the constellation point S0 having the intensity of 0 is not limited to FIG. 4A. The arrangement of the four constellation points is dependent on: the magnitude of phase modulation responsive to the bias voltage $DC_C$ applied to the phase shifter 101; and the amount of phase shift responsive to the RF voltage $RF_A$ and $RF_B$ applied respectively to the MZ modulator $MZ_A$ and $MZ_B$. For comparison, the constellation in the existing QPSK is shown in FIG. 4B. The numerical values on the I-axis and the Q-axis in FIG. 4 are values in arbitrary unit for indicating a relative positional relationship. It is the same with FIGS. 6 and 9 as shown below.

There are two methods for generating the constellation point S0 having the intensity of 0 in FIG. 4A as follows:
1) The RF voltages $RF_A$ and $RF_B$ are set so that both the MZ modulators $MZ_A$ and $MZ_B$ are in OFF state (extinction state) (First example); and
2) The RF voltage $RF_A$, $RF_B$ and bias voltage $DC_C$ are set so that the branched optical pulse $P2_A$ and the branched optical pulse P2'B are canceled due to the phase difference of 180° (Second example). Hereinafter, examples of the present invention will be described in detail.

2. First Example

2.1) Structure

As illustrated in FIG. 5, in an optical modulation device according to the first example of the present invention, a bias voltage $DC_C$ is applied to the phase shifter 101 to generate a phase difference φ=90° between the main arms. Further, as described before, the RF voltages $RF_A$ and $RF_B$ can turn off the MZ modulators $MZ_A$ and $MZ_B$, respectively (extinction state). By turning off both the MZ modulators $MZ_A$ and $MZ_B$, the constellation point S0 with the intensity of 0 can be generated on the I-Q plane. It is assumed that the phase modulation operating points of the MZ modulators $MZ_A$ and $MZ_B$ are previously adjusted by the bias voltages $DC_A$ and $DC_B$, respectively, and the bias voltage $DC_C$ is also adjusted to keep a phase difference φ=90° to realize the OFF state as described above. Since the optical waveguide structure and the controller illustrated in FIG. 5 are basically the same as those in FIG. 2, the same reference numerals are used for the same components, and detailed description thereof will be omitted.

2.2) Operation

Regarding the intensity or power of an optical pulse, the maximum value shall be normalized as "1". The intensity or power of an optical pulse shall be expressed as a relative numerical value between 0 and 1. Assuming that the intensity or power is proportional to the square of the amplitude, the amplitude of an optical pulse will be described with a similarly normalized value.

Figure 6:
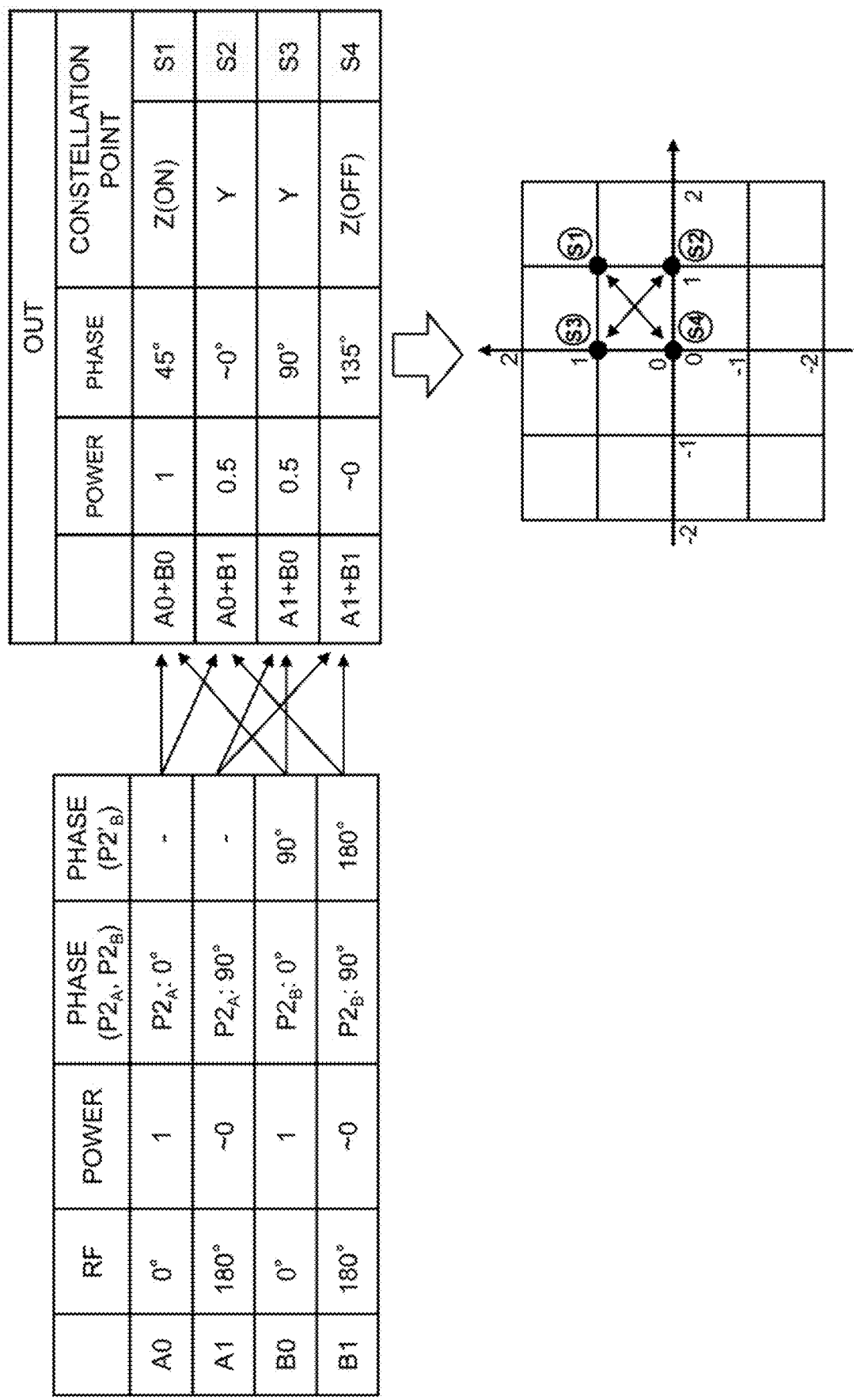
FIG. 6 is a diagram illustrating changes in amplitude and phase and its finally obtained constellation for explaining the operation of the nested modulator as shown in FIG. 5.

As illustrated in FIG. 6, the nested modulator 100 can generate a basis that is any of the four states according to the RF voltages $RF_A$ and $RF_B$. In other words, the MZ modulator $MZ_A$ to which the 0° RF voltage $RF_A$ is applied provides no phase modulation, thereby outputting the optical pulse $P2_A$ having substantially the same intensity and the same phase as the input optical pulse $P1_A$. Hereinafter, the optical pulse $P2_A$ is referred to as "A0" when the 0° RF voltage $RF_A$ is applied to the MZ modulator $MZ_A$. The MZ modulator $MZ_A$ to which the 180° RF voltage $RF_A$ is applied is turned off, thereby outputting the optical pulse $P2_A$ such that its intensity is substantially 0 and its phase is shifted by 90°. Hereinafter, the optical pulse $P2_A$ is referred to as "A1" when the 180° RF voltage $RF_A$ is applied to the MZ modulator $MZ_A$.

Similarly, the MZ modulator $MZ_B$ to which the 0° RF voltage $RF_B$ is applied provides no phase modulation, thereby outputting the optical pulse $P2_B$ having substantially the same intensity and the same phase as the input optical pulse $P1_B$. The MZ modulator $MZ_B$ to which the 180° RF voltage $RF_B$ is applied is turned off, thereby outputting the optical pulse $P2_B$ such that its intensity is substantially 0 and its phase is shifted by 90°. Further, the optical pulse $P2_B$ is subjected to 90° phase modulation by the phase shifter 101. Accordingly, when a 0° RF voltage $RF_B$ is applied, the phase shifter 101 outputs an optical pulse $P2'_B$ that has undergone 90° phase modulation. Hereinafter, the optical pulse $P2'_B$ is referred to as "B0" when the 0° RF voltage $RF_B$ is applied to the MZ modulator $MZ_B$. Since the MZ modulator $MZ_B$ is turned off when the 180° RF voltage $RF_B$ is applied, the phase shifter 101 outputs the optical pulse $P2'_B$ such that its intensity is substantially 0 and its phase is shifted by 180°. Hereinafter, the optical pulse $P2'_B$ is referred to as "B1" when the 180° RF voltage $RF_B$ is applied to the MZ modulator $MZ_B$.

In this way, the A0/A1 on the main arm A and the B0/B1 on the main arm B combine to obtain an optical signal OUT in any of the following four states S1 to S4.

A0+B0: The 0° RF voltage is applied to both the MZ modulators $MZ_A$ and $MZ_B$, causing both to be turned on. Accordingly, A0+B0 corresponds to a constellation point S1 (Z (ON) basis) having an intensity of 1 and a phase of 45°.

A0+B1: The 0° RF voltage is applied to the MZ modulator $MZ_A$, and the 180° RF voltage is applied to the MZ modulator $MZ_B$. Accordingly, A0+B1 corresponds to a constellation point S2 (Y basis) having an intensity of 0.5 and a phase of 0°.

A1+B0: The 180° RF voltage is applied to the MZ modulator $MZ_A$, and the 0° RF voltage is applied to the MZ modulator $MZ_B$. Accordingly, A1+B0 corresponds to a constellation point S3 (Y basis) having an intensity of 0.5 and a phase of 90°.

A1+B1: The 180° RF voltage is applied to both MZ modulators $MZ_A$ and $MZ_B$, causing both to be turned off. Accordingly, A1+B1 corresponds to a constellation point S4 (Z (OFF) basis) having an intensity of 0 and a phase of 135°.

<Phase-Time Coding>

Figure 7:
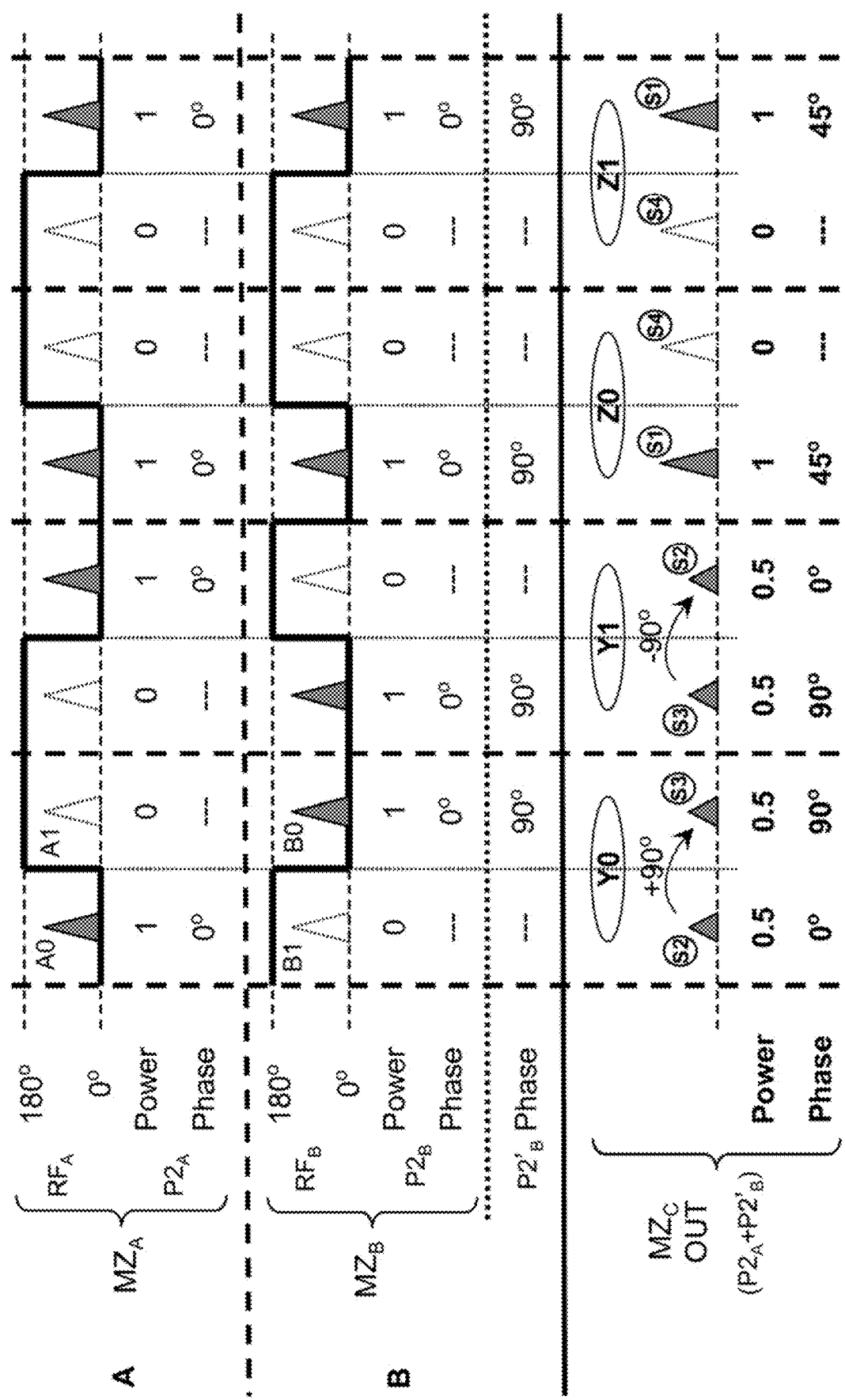
FIG. 7 is a timing chart illustrating an example of an optical modulation method using the nested modulator as shown in FIG. 5.

The four states Y0, Y1, Z0 and Z1 of the phase-time coding as shown in FIG. 7 can be obtained depending on the order in which the optical modulation of the above-described four states is performed on the two consecutive pulses which are coherent.

As illustrated in FIG. 7, the RF voltages $RF_A$ and $RF_B$ are varied. The details are as follows:

Modulation of the constellation point S2 (A0+B1) is performed on the leading pulse of the two consecutive pulses, and modulation of the constellation point S3 (A1+B0) is performed on the following pulse, resulting in Y0 state such that the following pulse is phase-shifted by +90° with respect to the leading pulse.

Modulation of the constellation point S3 (A1+B0) is performed on the leasing pulse of the two consecutive pulses, and modulation of the constellation point S2 (A0+B1) is performed on the following pulse, resulting in Y1 state such that the following pulse is phase-shifted by −90° with respect to the leading pulse.

Modulation of the constellation point S1 (A0+B0) is performed on the leading pulse of the two consecutive pulses, and modulation of the constellation point S4 (A1+B1) is performed on the following pulse, resulting in Z0 state such that the leading pulse has an intensity of 1 and the following pulse has an intensity of 0.

Modulation of the constellation point S4 (A1+B1) is performed on the leading pulse of the two consecutive pulses, and modulation of the constellation point S1 (A0+B0) is performed on the following pulse, resulting in Z1 state such that the leading pulse has an intensity of 0 and the following pulse has an intensity of 1.

2.3) Advantages

As described above, according to the first example of the present invention, the bias voltage $DC_C$ applied to the phase shifter 101 causes a phase difference $\varphi=90°$ between the main arms. Further by setting the RF voltages $RF_A$ and $RF_B$ as illustrated in FIG. 6, the four constellation points S1 to S4 can be generated on the I-Q plane. Specifically, by turning off both the MZ modulators $MZ_A$ and $MZ_B$, it is possible to generate the constellation point S4 having an intensity of 0 in the I-Q plane shown in FIG. 6.

Further, as illustrated in FIG. 7, among the four constellation points S1 to S4 including the constellation point S4 having an intensity of 0, the Z0/Z1 state is generated by phase modulation between the constellation points S1 and S4 and the Y0/Y1 state is generated by phase modulation between the constellation points S2 and S3. In this way, it is possible to generate a four-state signal lightwave required for the phase-time coding scheme.

Furthermore, according to the present example, the MZ modulators $MZ_A$ and $MZ_B$ can be in the OFF state in which its output intensity is 0, resulting in such an advantage that the phase-modulation operating point of the MZ modulator can be controlled easily by monitoring the intensity of each output lightwave of the MZ modulators $MZ_A$ and $MZ_B$.

3. Second Example

3.1) Structure

Figure 8:
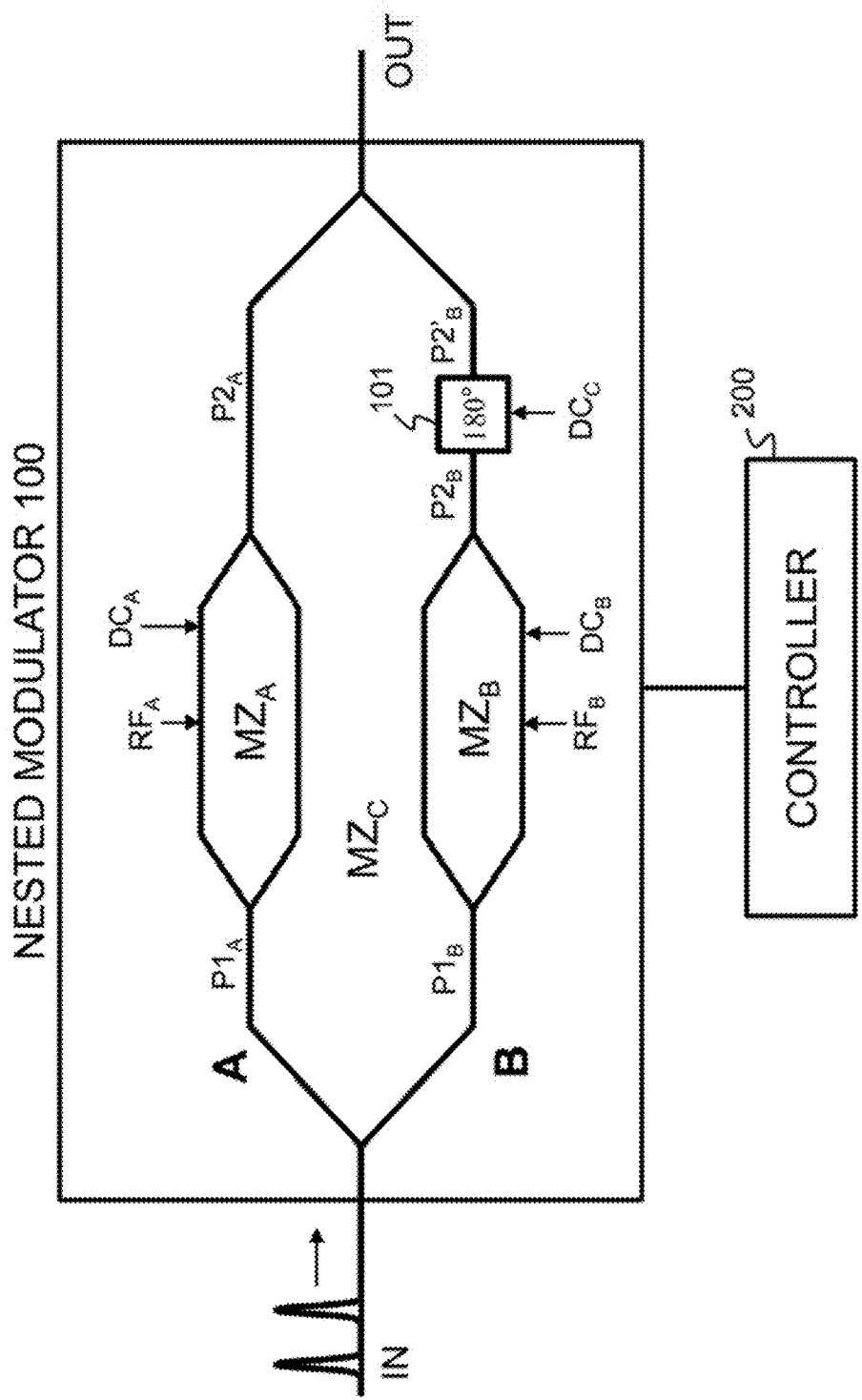
FIG. 8 is a schematic configuration diagram illustrating an example of a planar configuration of a nested modulator included in an optical modulator according to a second example of the present invention.

As illustrated in FIG. 8, in an optical modulation device according to the second example of the present invention, a bias voltage $DC_C$ is applied to the phase shifter 101 to generate a phase difference $\varphi=180°$ between the main arms. Further, as described before, the constellation point S0 (OFF state) with the intensity of 0 can be generated on the I-Q by setting the RF voltages $RF_A$ and $RF_B$ such that the branched optical pulse $P2_A$ and the branched optical pulse $P2'_B$ are canceled due to the phase difference of 180°. It is assumed that the phase modulation operating points of the MZ modulators $MZ_A$ and $MZ_B$ are previously adjusted by the bias voltages $DC_A$ and $DC_B$, respectively, and the bias voltage $DC_C$ is also adjusted to keep a phase difference $\varphi=180°$ to realize the OFF state as described above. Since the optical waveguide structure and the controller 200 illustrated in FIG. 8 are basically the same as those in FIG. 2, the same reference numerals are used for the same components, and detailed description thereof will be omitted.

3.2) Operation

Figure 9:
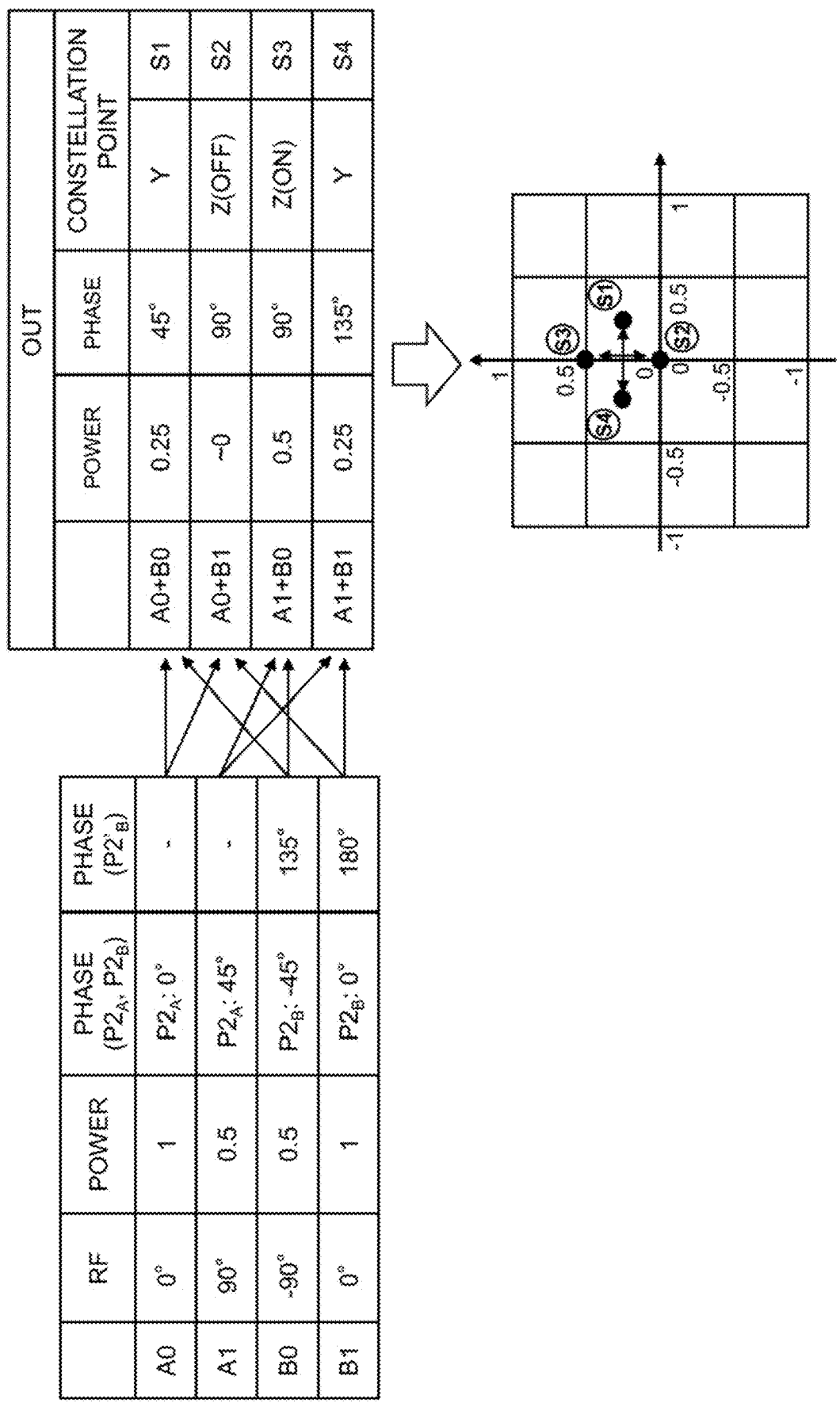
FIG. 9 is a diagram illustrating changes in amplitude and phase and its finally obtained constellation for explaining the operation of the nested modulator as shown in FIG. 8.

As illustrated in FIG. 9, the nested modulator 100 can generate any of the four states according to the RF voltages $RF_A$ and $RF_B$. In other words, the MZ modulator $MZ_A$ to which the 0° RF voltage $RF_A$ is applied provides no phase modulation, thereby outputting the optical pulse $P2_A$ having substantially the same intensity and the same phase as the input optical pulse $P1_A$. Hereinafter, the optical pulse $P2_A$ is referred to as "A0" when the 0° RF voltage $RF_A$ is applied to the MZ modulator $MZ_A$. The MZ modulator $MZ_A$ to which the 90° RF voltage $RF_A$ is applied outputs the optical pulse $P2_A$ such that its intensity is 0.5 and its phase is shifted by 45°. Hereinafter, the optical pulse $P2_A$ is referred to as "A1" when the 90° RF voltage $RF_A$ is applied to the MZ modulator $MZ_A$.

Similarly, the MZ modulator $MZ_B$ to which the −90° RF voltage $RF_B$ is applied outputs the optical pulse $P2_B$ such that its intensity is 0.5 and its phase is shifted by −45°. The MZ modulator $MZ_B$ to which the 0° RF voltage $RF_B$ is applied outputs the optical pulse $P2_B$ having substantially the same intensity and the same phase as the input optical pulse $P1_B$. Further, the optical pulse $P2_B$ is subjected to 180° phase modulation by the phase shifter 101. Accordingly, when a −90° RF voltage $RF_B$ is applied, the phase shifter 101 outputs an optical pulse $P2'_B$ that has undergone 135° phase modulation. Hereinafter, the optical pulse P2'B is referred to as "B0" when the −90° RF voltage $RF_B$ is applied to the MZ modulator $MZ_B$. When the −90° RF voltage $RF_B$ is applied, the phase shifter 101 outputs the optical pulse $P2'_B$ that has undergone 180° phase shift. Hereinafter, the optical pulse P2'B is referred to as "B1" when the 0° RF voltage $RF_B$ is applied to the MZ modulator $MZ_B$.

In this way, the A0/A1 on the main arm A and the B0/B1 on the main arm B combine to obtain an optical signal OUT in any of the following four states S1 to S4.

A0+B0: The 0° RF voltage is applied to the MZ modulator $MZ_A$ and the −90° RF voltage is applied to the MZ modulator $MZ_B$. Accordingly, A0+B0 corresponds to a constellation point S1 (Y basis) having an intensity of 0.25 and a phase of 45°.

A0+B1: The 0° RF voltage is applied to the MZ modulator $MZ_A$, and the 0° RF voltage is applied to the MZ modulator $MZ_B$. Accordingly, A0+B1 corresponds to a constellation point S2 (Z (OFF) basis) having an intensity of 0 and a phase of 90°.

A1+B0: The 90° RF voltage is applied to the MZ modulator $MZ_A$, and the −90° RF voltage is applied to the MZ modulator $MZ_B$. Accordingly, A1+B0 corresponds to a constellation point S3 (Z (ON) basis) having an intensity of 0.5 and a phase of 90°.

A1+B1: The 90° RF voltage is applied to MZ modulator $MZ_A$ and the 0° RF voltage is applied to the MZ modulator $MZ_B$. Accordingly, A1+B1 corresponds to a constellation point S4 (Y basis) having an intensity of 0.25 and a phase of 135°.

<Phase-Time Coding>

The four states Y0, Y1, Z0 and Z1 of the phase-time coding can be obtained, as in the case of the first example, depending on the order in which the optical modulation of the above-described four states is performed on two consecutive pulses which are coherent. The details are as follows:

Modulation of the constellation point S1 (A0+B0) is performed on the leading pulse of the two consecutive pulses, and modulation of the constellation point S4 (A1+B1) is performed on the following pulse, resulting in Y0 state such that the following pulse is phase-shifted by +90° with respect to the leading pulse.

Modulation of the constellation point S4 (A1+B1) is performed on the leasing pulse of the two consecutive pulses, and modulation of the constellation point S1 (A0+B0) is performed on the following pulse, resulting in Y1 state such that the following pulse is phase-shifted by −90° with respect to the leading pulse.

Modulation of the constellation point S3 (A1+B0) is performed on the leading pulse of the two consecutive pulses, and modulation of the constellation point S2 (A0+B1) is performed on the following pulse, resulting in Z0 state such that the leading pulse has an intensity of 0.5 and the following pulse has an intensity of 0.

Modulation of the constellation point S2 (A0+B1) is performed on the leading pulse of the two consecutive pulses, and modulation of the constellation point S3 (A1+B0) is performed on the following pulse, resulting in Z1 state such that the leading pulse has an intensity of 0 and the following pulse has an intensity of 0.5.

3.3) Advantages

As described above, according to the second example of the present invention, the bias voltage $DC_C$ applied to the phase shifter 101 causes a phase difference φ=180° between the main arms. Further by setting the RF voltages $RF_A$ and $RF_B$ as illustrated in FIG. 9, the four constellation points S1 to S4 can be generated on the I-Q plane. Specifically, by setting the MZ modulator $MZ_A$ for "A0" and the MZ modulator $MZ_B$ for "B1", the branched optical pulses $P2_A$ and P2'B are canceled due to a phase difference of 180°, which enables generating the constellation point S2 having an intensity of 0 in the I-Q plane shown in FIG. 9.

Further, as illustrated in FIG. 9, among the four constellation points S1 to S4 including the constellation point S2 having an intensity of 0, the Z0/Z1 state is generated by phase modulation between the constellation points S2 and S3 and the Y0/Y1 state is generated by phase modulation between the constellation points S1 and S4. In this way, it is possible to generate a four-state signal lightwave required for the phase-time coding scheme.

4. Third Example

As described above, in the MZ modulators $MZ_A$ and $MZ_B$, the phase modulation operating points are adjusted by the bias voltages $DC_A$ and $DC_B$, respectively, and the bias voltage $DC_C$ is also adjusted to keep a predetermined phase difference φ.

An optical modulator according to the third example of the present invention is provided with a control means for controlling the bias of the nested modulator 100 according to the first or second example as described above. Hereinafter, the bias control in the present example will be described taking as an example the nested modulator 100 according to the first example.

Figure 10:
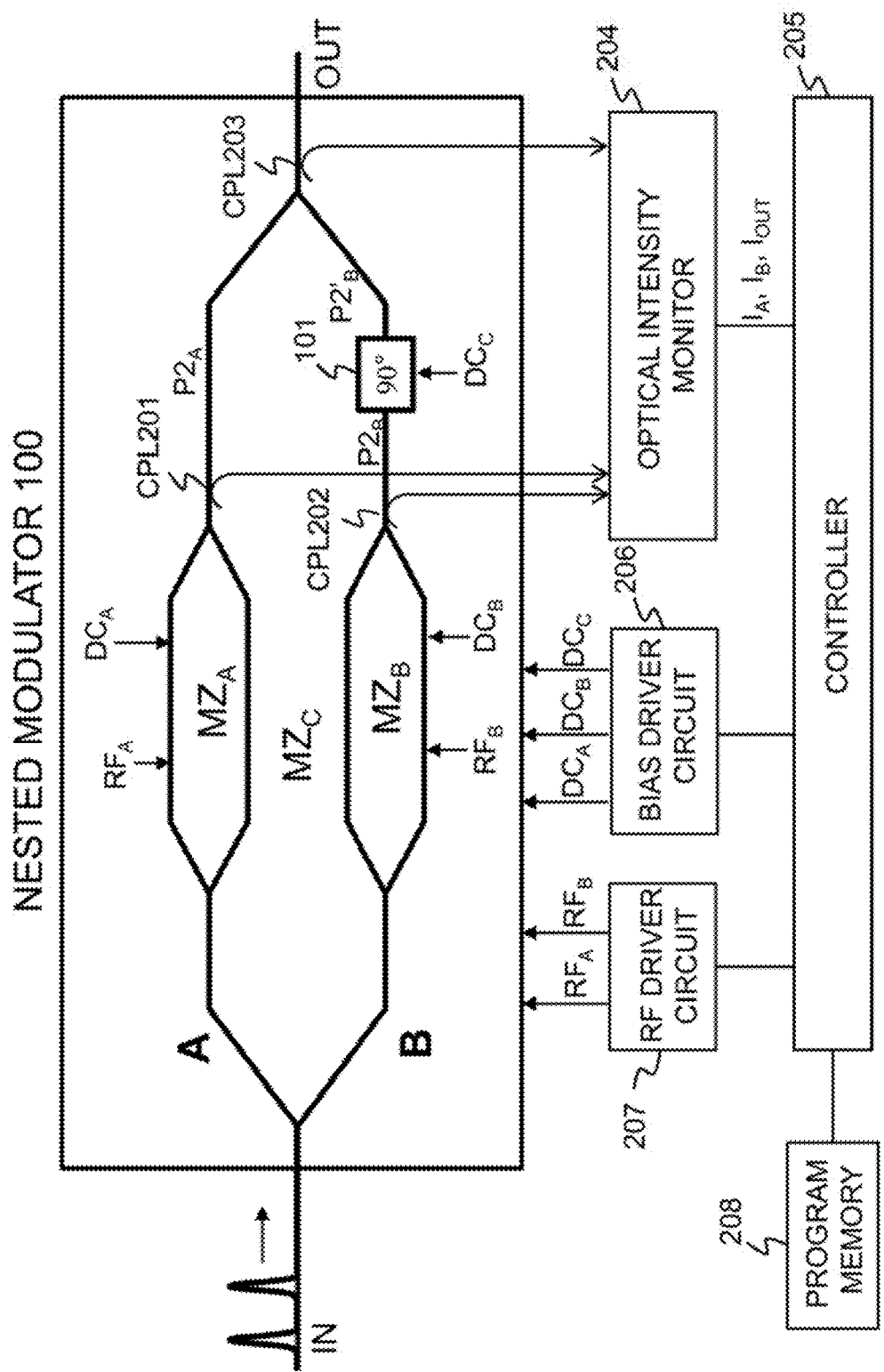
FIG. 10 is a block diagram illustrating an example of a circuit configuration of an optical modulator according to a third example of the present invention.

As illustrated in FIG. 10, the nested modulator 100 includes couplers 201 and 202 for intensity monitoring on the optical waveguides in the output sides of the MZ modulators $MZ_A$ and $MZ_B$, respectively, and a coupler 203 for intensity monitoring on the optical waveguide in the output side of the main MZ modulator $MZ_C$. An optical intensity monitor 204 inputs optical pulses $P2_A$, $P2_B$ and OUT for monitoring from the couplers to detect intensities $I_A$, $I_B$ and $I_{OUT}$, respectively, which are then output to a controller 205.

The controller 205 controls the bias driver circuit 206 based on the intensities $I_A$, $I_B$ and $I_{OUT}$ to adjust the DC bias voltages $DC_A$, $DC_B$ and $DC_C$ for an expected phase modulation result. Further, the controller 205 controls the RF driver circuit 207 to vary the RF voltages $RF_A$ and $RF_B$ so that the phase-time coding is performed by the predetermined constellation points S1 to S4.

The controller 205 may be configured in hardware, but it may also be executed by a processor capable of executing computer programs. In other words, a CPU (Central Processing Unit) may execute the programs stored in a program memory 208 to control the above-mentioned DC bias voltages $DC_A$, $DC_B$ and $DC_C$.

As already described, according to the first example of the present invention, when both the MZ modulators $MZ_A$ and $MZ_B$ are turned off, the state in which the intensity is 0 is obtained. Therefore, the intensities $I_A$, $I_B$ and $I_{OUT}$ are detected in that state. The operating point of each phase modulator can be easily controlled by comparing these intensities with a predetermined threshold value. Such bias control may also be applied to the nested modulator 100 according to the second example of the present invention.

5. QKD System

The optical modulator according to the first to third examples described above may be applied to a Quantum Key Distribution system employing the phase-time coding scheme.

Hereinafter, as an example, a one-way or unidirectional QKD system of the phase-time coding scheme will be described with reference to FIG. 11. The above examples may be similarly applied not only to the one-way QKD system but also to a two-way or bidirectional QKD system.

Figure 11:
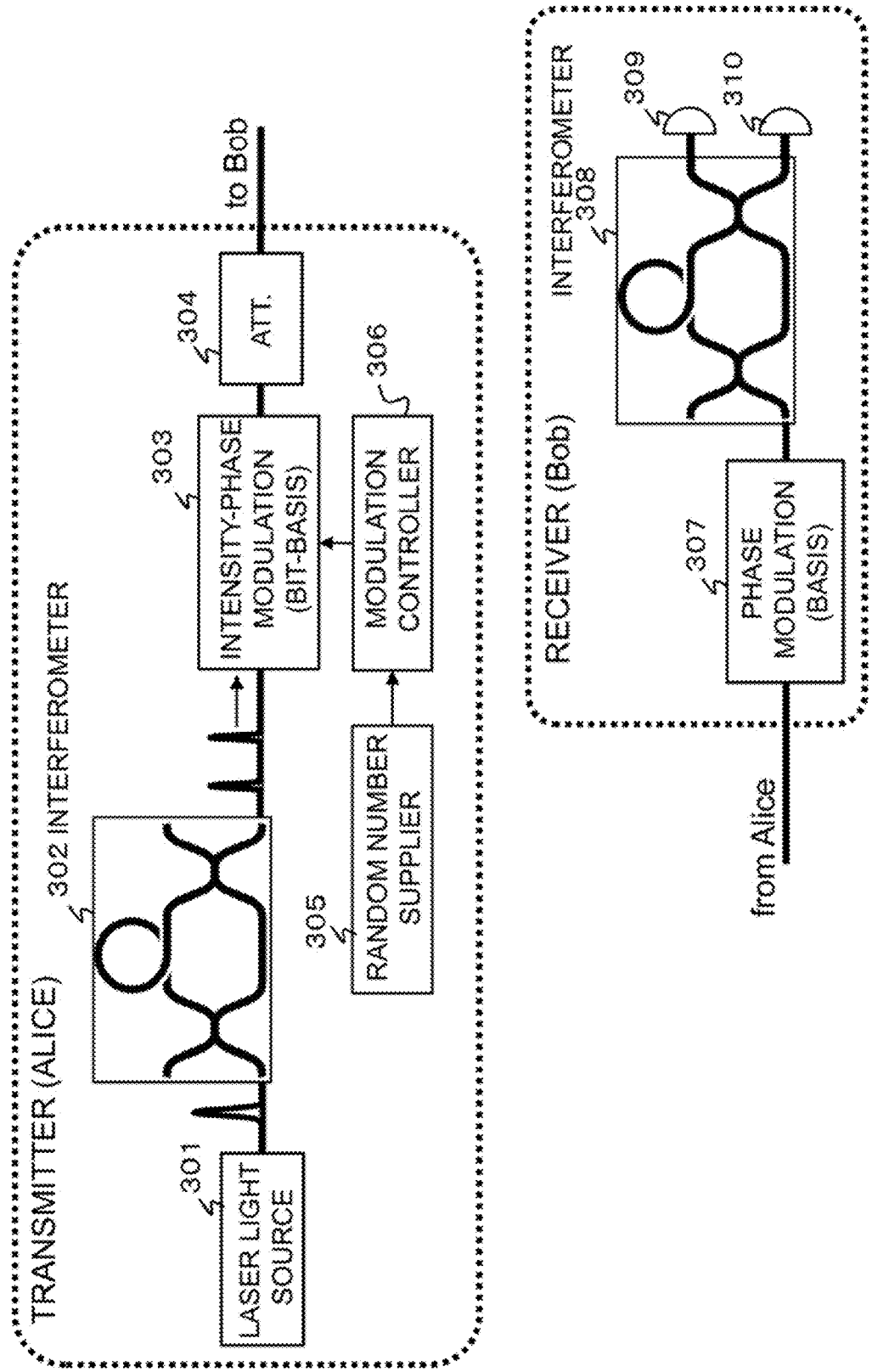
FIG. 11 is a system configuration diagram illustrating schematic configurations of a transmitter (Alice) and a receiver (Bob), the transmitter using the optical modulation device according to an exemplary embodiment of the present invention.

As illustrated in FIG. 11, the one-way QKD system includes a transmitter (Alice) and a receiver (Bob) which are connected by an optical fiber, and various quantum cryptography key distribution algorithms may be used to distribute quantum keys from Alice to Bob.

Alice includes a laser light source 301, an asymmetric interferometer 302, an intensity phase modulator 303, an attenuator 304, a random number supplier 305, a modulation controller 306, and other synchronization units and control units (not shown). The intensity phase modulator 303 may be configured by the nested modulator 100 according to the first or second example of the present invention. Further, the intensity phase modulator 303 and the modulation controller 306 may be configured by the nested modulator 100 and the controller 205 according to the third example of the present invention. Bob includes a phase modulator 307, an asymmetric interferometer 308, photon detectors 309 and 310, other synchronization units, a control unit (not shown), and the likes. Alice's asymmetric interferometer 302 and Bob's asymmetric interferometer 308 have the same structure.

The modulation controller 306 controls the intensity phase modulator 303 according to the random numbers input from the random number supplier 305. More specifically, as illustrated in FIG. 7, the RF voltages $RF_A$ and $RF_B$ of the nested modulator 100 are changed according to random numbers for basis and information bits to perform intensity and phase modulation on two consecutive pulses which are coherent. At that time, as described in the third example, the bias driver circuit 206 is controlled based on the intensities $I_A$, $I_B$, and $I_{OUT}$ detected from optical signals for monitoring the output optical pulses $P2_A$, $P2_B$, and OUT, respectively. It is desirable to control the DC bias voltages $DC_A$, $DC_B$ and $DC_C$ so as to obtain an expected phase modulation result.

An optical pulse emitted from the laser light source 301 is divided in time into two consecutive coherent pulses (a double pulse) by passing through the asymmetric interferometer 302. A train of double pulses is encoded in the phase-time coding scheme by the intensity phase modulator 303 (the nested modulator 100) according to random numbers for basis and information bits. The train of double pulses thus encoded is transmitted to the Bob through the attenuator 304.

The phase modulator 307 of Bob performs phase modulation on each double pulse reaching Bob according to random number for basis. When each double pulse passes through the asymmetric interferometer 308, the leading pulse and the following pulse of the double pulse interfere with each other. The interference results are detected by the photon detectors 309 and 310. Information can be detected from a phase difference between the leading pulse and the following pulse for each double pulse.

6. Supplementary Notes

The whole or part of the example embodiments disclosed above can be described as, but not limited to, the following supplementary notes.

(Supplementary Note 1)

An optical modulation device comprising:

a nested modulator including a first modulator and a second modulator of Mach-Zehnder type, and a phase shifter, wherein the first modulator and the second modulator are connected in parallel, wherein the phase shifter generates a predetermined phase difference between output lightwaves of the first modulator and the second modulator;

a control means that controls the phase difference generated by the phase shifter and an intensity and a magnitude of phase modulation provided by each of the first modulator and the second modulator, to change an output lightwave of the nested modulator between four constellation points on IQ plane, wherein a first constellation point of the four constellation points has an intensity of 0, a second constellation point has a relative intensity of 1, each of a third constellation point and a fourth constellation point has a relative intensity ranging from 0 to 1, and the third and the fourth constellation points has a phase difference of 90 degrees.

(Supplementary Note 2)

The optical modulation device according to supplementary note 1, wherein the first constellation point is obtained by setting both the first and second modulators for off state in which an output lightwave of each of the first and second modulators has an intensity of 0.

(Supplementary Note 3)

The optical modulation device according to supplementary note 2, wherein the phase difference generated by the phase shifter is set to 90 degrees, the second constellation point is obtained by setting both the first and second modulators for on state in which an output lightwave of each of the first and second modulators has a relative intensity of 1, and the third and the fourth constellation points are obtained by setting one of the first and second modulators for off state in which an output lightwave of the one has an intensity of 0 and setting the other for on state in which an output lightwave of the other has a relative intensity of 1.

(Supplementary Note 4)

The optical modulation device according to any one of supplementary notes 1-3, wherein each of the first and second modulators is a Mach-Zehnder modulator having a control electrode for controlling the intensity and the magnitude of phase modulation, the control means applies a voltage of an amplitude corresponding to a phase modulation of 180 degrees to a first control electrode of the first modulator and a second control electrode of the second modulator and applies a DC bias voltage correspond to a phase difference of 90 degrees to the phase shifter.

(Supplementary Note 5)

The optical modulation device according to supplementary note 1, wherein the first constellation point is obtained by setting a phase difference between an output lightwave given the phase difference generated by the phase shifter and an output lightwave given no phase difference at 180 degrees.

(Supplementary Note 6)

The optical modulation device according to supplementary note 5, wherein the phase difference generated by the phase shifter is set to 180 degrees, the second constellation point is obtained by setting the first modulator for a phase modulation of 90 degrees and the second modulator for a phase modulation of −90 degrees, and the third and the fourth constellation points are obtained by setting one of the first and second modulators for on state in which an output lightwave of the one has an intensity of 1 and setting the other for a phase modulation of 90 or −90 degrees.

(Supplementary Note 7)

The optical modulation device according to any one of supplementary notes 1, 5 and 6, wherein each of the first and second modulators is a Mach-Zehnder modulator having a control electrode for controlling the intensity and the magnitude of phase modulation, the control means applies a voltage of an amplitude corresponding to a phase modulation of 90 degrees to a first control electrode of the first modulator, applies a voltage of an amplitude corresponding to a phase modulation of −90 degrees to a second control electrode of the second modulator, and applies a DC bias voltage correspond to a phase difference of 180 degrees to the phase shifter.

(Supplementary Note 8)

The optical modulation device according to any one of supplementary notes 1-7, wherein the nested modulator performs intensity and phase modulation on two consecutive optical pulses which are coherent, according to phase-time coding scheme, the control means generates a Z-basis state of the phase-time coding scheme between the first constellation point and the second constellation point, and generates a Y-basis state between the third constellation point and the fourth constellation point.

(Supplementary Note 9)

A transmitter in a quantum key distribution system, comprising the optical modulation device according to supplementary note 8.

(Supplementary Note 10)

An optical modulation method using a nested modulator including a first modulator and a second modulator of Mach-Zehnder type, and a phase shifter, wherein the first modulator and the second modulator are connected in parallel, wherein the phase shifter generates a predetermined phase difference between output lightwaves of the first modulator and the second modulator, by a control means, controlling the phase difference generated by the phase shifter and an intensity and a magnitude of phase modulation provided by each of the first modulator and the second modulator, to change an output lightwave of the nested modulator between four constellation points on IQ plane;

wherein a first constellation point of the four constellation points has an intensity of 0, a second constellation point has a relative intensity of 1, each of a third constellation point and a fourth constellation point has a relative intensity ranging from 0 to 1, and the third and the fourth constellation points has a phase difference of 90 degrees.

(Supplementary Note 11)

The optical modulation method according to supplementary note 10, wherein the first constellation point is obtained by the control means setting both the first and second modulators for off state in which an output lightwave of each of the first and second modulators has an intensity of 0.

(Supplementary Note 12)

The optical modulation method according to supplementary note 11, wherein by the control means, the phase difference generated by the phase shifter is set to 90 degrees, the second constellation point is obtained by setting both the first and second modulators for on state in which an output lightwave of each of the first and second modulators has a relative intensity of 1, and the third and the fourth constellation points are obtained by setting one of the first and second modulators for off state in which an output lightwave of the one has an intensity of 0 and setting the other for on state in which an output lightwave of the other has a relative intensity of 1.

(Supplementary Note 13)

The optical modulation method according to any one of supplementary notes 10-13, wherein each of the first and second modulators is a Mach-Zehnder modulator having a control electrode for controlling the intensity and the magnitude of phase modulation, by the control means, a voltage of an amplitude corresponding to a phase modulation of 180 degrees is applied to a first control electrode of the first modulator and a second control electrode of the second modulator, and a DC bias voltage correspond to a phase difference of 90 degrees is applied to the phase shifter.

(Supplementary Note 14)

The optical modulation method according to supplementary note 10, wherein the first constellation point is obtained by setting a phase difference between an output lightwave given the phase difference generated by the phase shifter and an output lightwave given no phase difference at 180 degrees.

(Supplementary Note 15)

The optical modulation method according to supplementary note 14, wherein by the control means, the phase difference generated by the phase shifter is set to 180 degrees, the second constellation point is obtained by setting the first modulator for a phase modulation of 90 degrees and the second modulator for a phase modulation of −90 degrees, and the third and the fourth constellation points are obtained by setting one of the first and second modulators for on state in which an output lightwave of the one has an intensity of 1 and setting the other for a phase modulation of 90 or −90 degrees.

(Supplementary Note 16)

The optical modulation method according to any one of supplementary notes 10, 14 and 15, wherein each of the first and second modulators is a Mach-Zehnder modulator having a control electrode for controlling the intensity and the magnitude of phase modulation, by the control means, a voltage of an amplitude corresponding to a phase modulation of 90 degrees is applied to a first control electrode of the first modulator, a voltage of an amplitude corresponding to a phase modulation of −90 degrees is applied to a second control electrode of the second modulator, and a DC bias voltage correspond to a phase difference of 180 degrees is applied to the phase shifter.

(Supplementary Note 17)

The optical modulation method according to any one of supplementary notes 10-16, wherein by the nested modulator, an intensity and phase modulation on two consecutive optical pulses which are coherent is performed according to phase-time coding scheme, by the control means, a Z-basis state of the phase-time coding scheme is generated between the first constellation point and the second constellation point, and a Y-basis state is generated between the third constellation point and the fourth constellation point.

(Supplementary Note 18)

A program functioning a computer as a control means for controlling a nested modulator including a first modulator and a second modulator of Mach-Zehnder type, and a phase shifter, wherein the first modulator and the second modulator are connected in parallel, wherein the phase shifter generates a predetermined phase difference between output lightwaves of the first modulator and the second modulator, the program comprising:

controlling the phase difference generated by the phase shifter and an intensity and a magnitude of phase modulation provided by each of the first modulator and the second modulator, to change an output lightwave of the nested modulator between four constellation points on IQ plane;

wherein a first constellation point of the four constellation points has an intensity of 0, a second constellation point has a relative intensity of 1, each of a third constellation point and a fourth constellation point has a relative intensity ranging from 0 to 1, and the third and the fourth constellation points has a phase difference of 90 degrees.

The present invention should obtain the benefit of priority claim based on a patent application identified by Japanese Patent Application No. 2019-049863 filed on Mar. 18, 2019 in Japan, and the contents described in the patent application should be all included in the present disclosure.

INDUSTRIAL APPLICABILITY

The present invention can be applied to an optical communication system, particularly an optical modulator of a quantum key distribution system.

EXPLANATION OF SIGNS

100 Nested modulator
101 Phase shifter
102 RF electrode
103, 104, 106, 107 Ground (GND) electrode
105 DC bias electrode
200 Controller
201-203 Coupler
204 Optical intensity monitor
205 Controller
206 Bias driver circuit
207 RF driver circuit
208 Program Memory
301 Laser light source
302 Asymmetric interferometer
303 Intensity and phase modulator
304 Attenuator
305 Random number supplier
306 Modulation controller
307 Phase modulator (basis)
308 Asymmetric interferometer
309, 310 Photon detector
$MZ_A$, $MZ_B$ Mach-Zehnder (MZ) modulator
$MZ_C$ Main MZ interferometer
$RF_A$, $RF_B$ high frequency voltage
$DC_A$, $DC_B$, $DC_C$ DC bias voltage

What is claimed is:

1. An optical modulation device comprising:
   a nested modulator including a first modulator based on Mach-Zehnder interferometer, a second modulator based on Mach-Zehnder interferometer and a phase shifter, wherein the first modulator and the second modulator are connected in parallel, wherein the phase shifter generates a predetermined phase difference between output lightwaves of the first modulator and the second modulator;
   a controller configured to control the phase difference generated by the phase shifter and an intensity and a magnitude of phase modulation provided by each of the first modulator and the second modulator, to change an output lightwave of the nested modulator between four constellation points on IQ plane,
   wherein a first constellation point of the four constellation points has an intensity of 0, a second constellation point has a relative intensity of 1, each of a third constellation point and a fourth constellation point has a relative intensity ranging from 0 to 1, and the third and the fourth constellation points has a phase difference of 90 degrees,
   wherein the first modulator is a Mach-Zehnder modulator having a first control electrode for controlling the intensity and the magnitude of phase modulation and the second modulator is a Mach-Zehnder modulator having a second control electrode for controlling the intensity and the magnitude of phase modulation,
   the controller further configured to apply a voltage of an amplitude corresponding to a phase modulation of 90 degrees to the first control electrode of the first modulator, to apply a voltage of an amplitude corresponding to a phase modulation of −90 degrees to the second control electrode of the second modulator, and to apply a DC bias voltage corresponding to a phase difference of 180 degrees to the phase shifter.

2. The optical modulation device according to claim 1, wherein the first constellation point is obtained by setting a phase difference at 180 degrees between a first output lightwave of the first modulator and an output lightwave of the phase shifter giving a second lightwave of the second modulator the predetermined phase difference.

3. The optical modulation device according to claim 2, wherein
   the phase difference generated by the phase shifter is set to 180 degrees,
   the second constellation point is obtained by setting the first modulator for a phase modulation of 90 degrees and the second modulator for a phase modulation of −90 degrees, and
   the third and the fourth constellation points are obtained by setting one of the first and second modulators for on state in which an output lightwave of the one has an intensity of 1 and setting the other for a phase modulation of 90 or −90 degrees.

4. The optical modulation device according to claim 1, wherein
   the nested modulator performs intensity and phase modulation on two consecutive optical pulses which are coherent, according to phase-time coding scheme,
   the controller further configured to generate a Z-basis state of the phase-time coding scheme between the first constellation point and the second constellation point and to generate a Y-basis state between the third constellation point and the fourth constellation point.

5. A transmitter in a quantum key distribution system, comprising the optical modulation device according to claim 4.

6. An optical modulation method using a nested modulator including a first modulator, based on Mach-Zehnder interferometer, a second modulator based on Mach-Zehnder interferometer, and a phase shifter, wherein the first modulator and the second modulator are connected in parallel, wherein the phase shifter generates a predetermined phase difference between output lightwaves of the first modulator and the second modulator, the method comprising:
   controlling the phase difference generated by the phase shifter and an intensity and a magnitude of phase modulation provided by each of the first modulator and the second modulator, to change an output lightwave of the nested modulator between four constellation points on IQ plane;
   wherein a first constellation point of the four constellation points has an intensity of 0, a second constellation point has a relative intensity of 1, each of a third constellation point and a fourth constellation point has a relative intensity ranging from 0 to 1, and the third and the fourth constellation points has a phase difference of 90 degrees,
   wherein the first modulator is a Mach-Zehnder modulator having a first control electrode for controlling the intensity and the magnitude of phase modulation and the second modulator is a Mach-Zehnder modulator having a second control electrode for controlling the intensity and the magnitude of phase modulation, the method further comprising:
   applying a voltage of an amplitude corresponding to a phase modulation of 90 degrees to the first control electrode of the first modulator,
   applying a voltage of an amplitude corresponding to a phase modulation of −90 degrees to the second control electrode of the second modulator, and
   applying a DC bias voltage correspond to a phase difference of 180 degrees to the phase shifter.

7. The optical modulation method according to claim 6, wherein the first constellation point is obtained by setting a phase difference at 180 degrees between a first output lightwave of the first modulator and an output lightwave of the phase shifter giving a second lightwave of the second modulator the predetermined phase difference.

8. The optical modulation method according to claim 7, further comprising:
   setting the phase difference generated by the phase shifter to 180 degrees,
   setting the first modulator for a phase modulation of 90 degrees and the second modulator for a phase modulation of −90 degrees, to obtain the second constellation point, and
   setting one of the first and second modulators for on state in which an output lightwave of the one has an intensity of 1 and setting the other for a phase modulation of 90 or −90 degrees to obtain the third and the fourth constellation points.

9. The optical modulation method according to claim 6, the method further comprising:
   controlling the nested modulator to perform an intensity and phase modulation on two consecutive optical pulses which are coherent according to phase-time coding scheme,
   generating a Z-basis state of the phase-time coding scheme between the first constellation point and the second constellation point, and
   generating a Y-basis state between the third constellation point and the fourth constellation point.

10. A computer-readable non-transitory recording medium storing a program comprising a set of instructions to control a nested modulator including a first modulator based on Mach-Zehnder interferometer, a second modulator based on Mach-Zehnder interferometer, and a phase shifter, wherein the first modulator and the second modulator are connected in parallel, wherein the phase shifter generates a predetermined phase difference between output lightwaves of the first modulator and the second modulator, the program comprising:
   controlling the phase difference generated by the phase shifter and an intensity and a magnitude of phase modulation provided by each of the first modulator and the second modulator, to change an output lightwave of the nested modulator between four constellation points on IQ plane;
   wherein a first constellation point of the four constellation points has an intensity of 0, a second constellation point has a relative intensity of 1, each of a third constellation point and a fourth constellation point has a relative intensity ranging from 0 to 1, and the third and the fourth constellation points has a phase difference of 90 degrees,
   wherein the first modulator is a Mach-Zehnder modulator having a first control electrode for controlling the intensity and the magnitude of phase modulation and the second modulator is a Mach-Zehnder modulator having a second control electrode for controlling the intensity and the magnitude of phase modulation, the program further comprising:
   applying a voltage of an amplitude corresponding to a phase modulation of 90 degrees to the first control electrode of the first modulator,
   applying a voltage of an amplitude corresponding to a phase modulation of −90 degrees to the second control electrode of the second modulator, and
   applying a DC bias voltage correspond to a phase difference of 180 degrees to the phase shifter.

* * * * *